United States Patent
Takayama et al.

(10) Patent No.: US 7,137,581 B2
(45) Date of Patent: Nov. 21, 2006

(54) METHODS AND APPARATUS FOR AN IMPROVED ROTARY GRATER

(75) Inventors: Steven R. Takayama, Atherton, CA (US); Jon Henry LeFors, San Francisco, CA (US); Annetta M. Papadopoulos, Palo Alto, CA (US)

(73) Assignee: Zyliss USA Corp., Irvine, CA (US)

( * ) Notice: Subject to any disclaimer, the term of this patent is extended or adjusted under 35 U.S.C. 154(b) by 0 days.

(21) Appl. No.: 10/911,971

(22) Filed: Aug. 5, 2004

(65) Prior Publication Data

US 2005/0082401 A1  Apr. 21, 2005

Related U.S. Application Data

(60) Provisional application No. 60/492,651, filed on Aug. 5, 2003.

(51) Int. Cl.
  *A01D 34/90* (2006.01)
  *B02C 17/02* (2006.01)
  *B02C 19/20* (2006.01)

(52) U.S. Cl. .................. 241/169.1; 241/93; 241/273.3

(58) Field of Classification Search .................. 241/93, 241/168, 169, 169.1, 273.3
See application file for complete search history.

(56) References Cited

U.S. PATENT DOCUMENTS

| | | | | |
|---|---|---|---|---|
| 2,502,867 A | * | 4/1950 | Mantelet | 241/273.3 |
| 2,587,186 A | * | 2/1952 | Mantelet | 241/273.3 |
| 2,804,896 A | * | 9/1957 | Silberberg | 241/273.3 |
| 3,912,176 A | * | 10/1975 | Mantelet | 241/93 |
| 4,199,112 A | * | 4/1980 | McLean | 241/92 |
| 4,505,434 A | * | 3/1985 | Martenas et al. | 241/89.3 |
| 4,856,718 A | * | 8/1989 | Gaber et al. | 241/93 |
| 5,197,681 A | * | 3/1993 | Liebermann | 241/65 |
| 5,803,378 A | * | 9/1998 | Wolters | 241/93 |
| 6,464,156 B1 | * | 10/2002 | Wexell | 241/93 |
| 6,766,972 B1 | * | 7/2004 | Prommel et al. | 241/93 |
| 6,915,973 B1 | * | 7/2005 | So | 241/169.1 |

* cited by examiner

*Primary Examiner*—Faye Francis
(74) *Attorney, Agent, or Firm*—Snell & Wilmer LLP

(57) ABSTRACT

A hand-held rotary grating device is configured to grate soft cheeses that have traditionally been exceedingly difficult or impossible to grate. A cylindrical grating barrel is rotateably inserted within a grater housing. The barrel has an advantageous barrel aspect ratio—i.e., the ratio of the diameter of the barrel to the hopper width is sufficiently large that the grated food material falls through the opening of the barrel rather than accumulating and retarding the grating motion. The effective aspect ratio of the barrel is greater than approximately 1.5, preferably between approximately 1.5 and 2.5, and most preferably about 2.0. The barrel includes a graspable handle that is collapsible within the body of the barrel, and which includes a bearing surface that prevents axial movement of the barrel within the housing when the handle is extended, but which allows movement (and removal) of the barrel when the handle is collapsed.

12 Claims, 10 Drawing Sheets

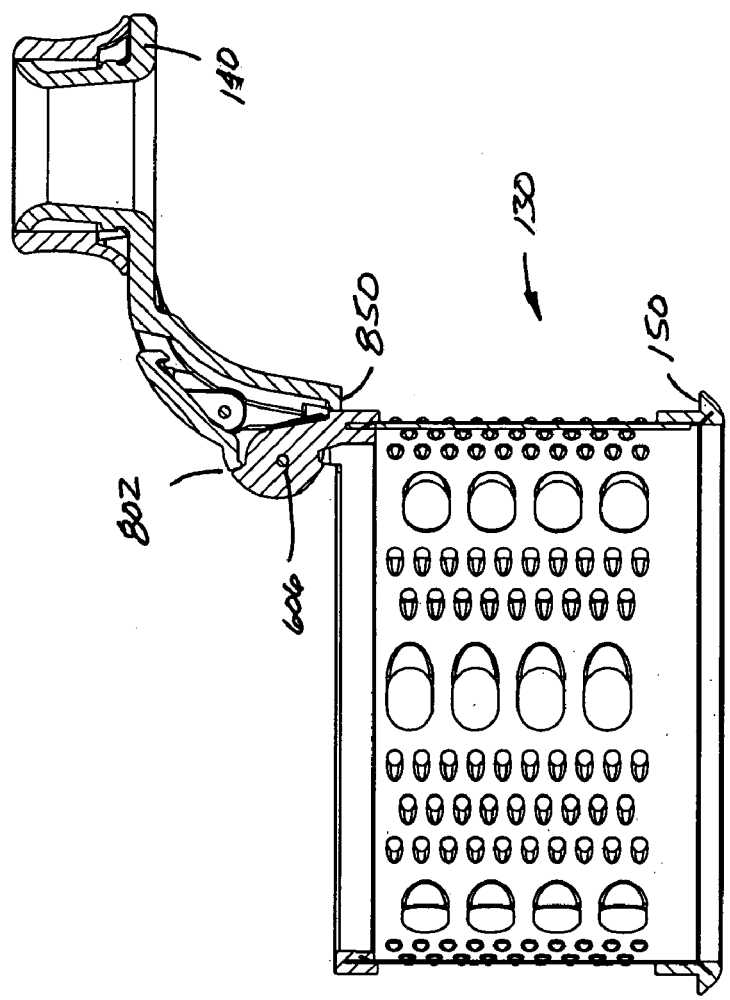

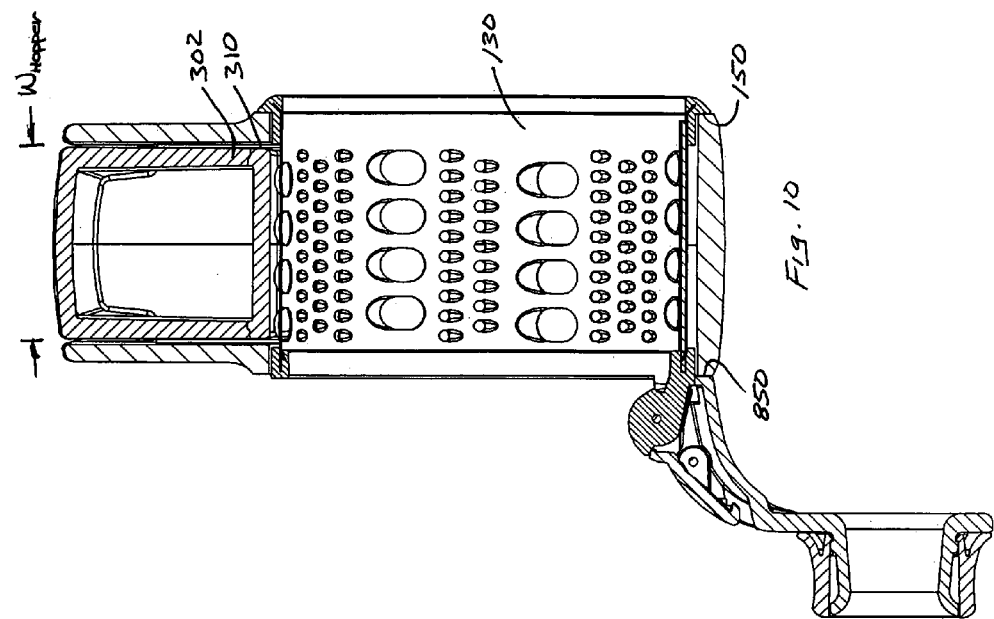
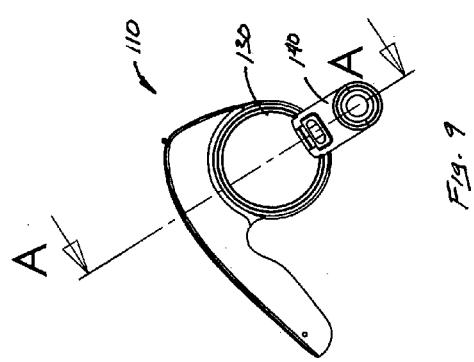

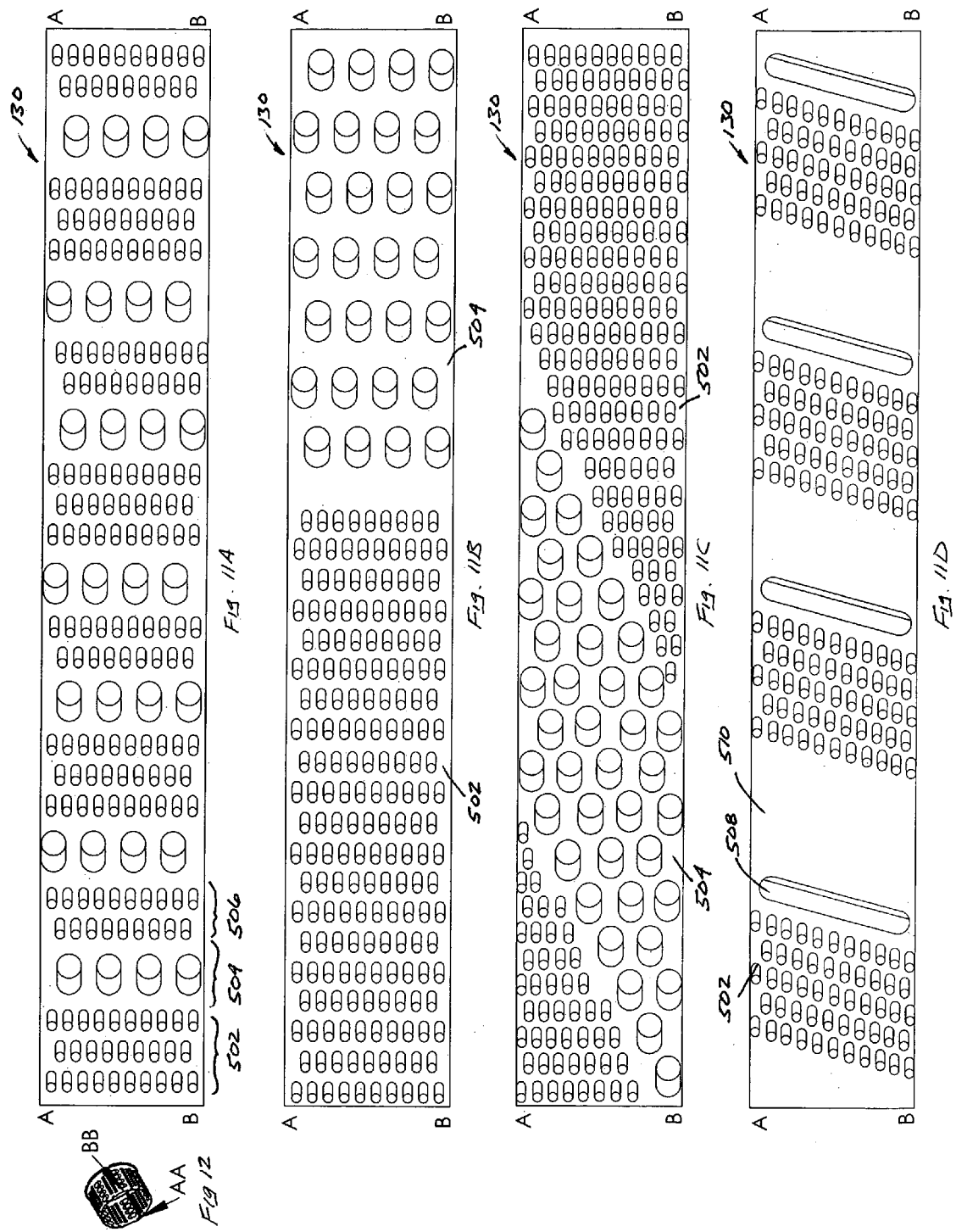

METHODS AND APPARATUS FOR AN IMPROVED ROTARY GRATER

CROSS REFERENCE TO RELATED APPLICATIONS

This application claims the benefit of Provisional Patent Application No. 60/492,651, filed Aug. 5, 2003, which is hereby incorporated by reference.

FIELD OF THE INVENTION

The present invention generally relates to food preparation devices and, more particularly, to an improved hand-held rotary grater configured to grate a wide range of cheeses, including soft cheeses.

BACKGROUND

It is often convenient to utilize a hand-held rotary-type grater to grate cheese and other such food products, particularly when a large volume of grated cheese is required. Such systems typically include a grating barrel that the user manually rotates with respect to the grater housing and which includes a series of cutting perforations or the like to cut away segments of cheese placed in a hopper.

Such prior art hand-held rotary graters are unsatisfactory in a number of respects. Most notably, while these devices work fairly well on hard cheeses such as parmesan, mizithra, etc., they are ineffective at grating soft cheeses such as mozzarella, cheddar, jack, and the like. More particularly, prior art graters tend to produce large strings of soft cheese segments during grating which quickly interfere with each other and the inner surfaces of the barrel, retarding the discharge of the cheese from the device and thereby rendering the grater ineffective. That is, while some prior art graters are capable of grating soft cheese, the cheese segments produced by such graters accumulate within the barrel rather than falling through, giving unsatisfactory results.

Furthermore, while some prior art graters allow the barrel to be removed from the housing (i.e., to facilitate cleaning), this often requires the user to unthread the handle from the unit or the barrel, which may necessitate the user manually holding the barrel stationary.

Accordingly, hand-held rotary graters are therefore needed to overcome these and other limitations of the prior art.

SUMMARY

The present invention provides a novel hand-held rotary grating device configured to grate, not only hard cheese, but also soft cheeses that have traditionally been exceedingly difficult or impossible to grate. This is achieved by employing a cylindrical grating barrel that is rotateably connected to the grater housing and which has an advantageous barrel aspect ratio—i.e., the ratio of the diameter of the barrel to the hopper width is sufficiently large that the grated food material falls through the opening of the barrel rather than accumulating and retarding the grating motion.

In accordance with a particular embodiment of the present invention, the barrel aspect ratio is greater than approximately 1.5, preferably between approximately 1.5 and 2.5, and most preferably about 2.0.

In accordance with another aspect of the present invention, the barrel includes a graspable handle that is collapsible within the body of the barrel, and which includes a bearing surface that prevents axial movement of the barrel within the housing when the handle is extended, but which allows movement (and removal) of the barrel when the handle is collapsed.

BRIEF DESCRIPTION OF THE DRAWINGS

A more complete understanding of the present invention may be derived by referring to the detailed description when considered in connection with the Figures, where like reference numbers refer to similar elements throughout the Figures, and:

FIGS. 6–8 show an exemplary barrel design with a collapsable handle;

FIG. 9 shows a side view of an exemplary grater in accordance with the present invention;

FIG. 10 shows a cross-sectional view (A—A) of the grater depicted in FIG. 9; and FIGS. 11A–D show various grater patterns in accordance with selected embodiments of the present invention.

FIG. 12 shows the orientation of the grating patterns of FIGS. 11A–D with respect to the barrel according to one embodiment of the present invention.

DETAILED DESCRIPTION

Figure 1:
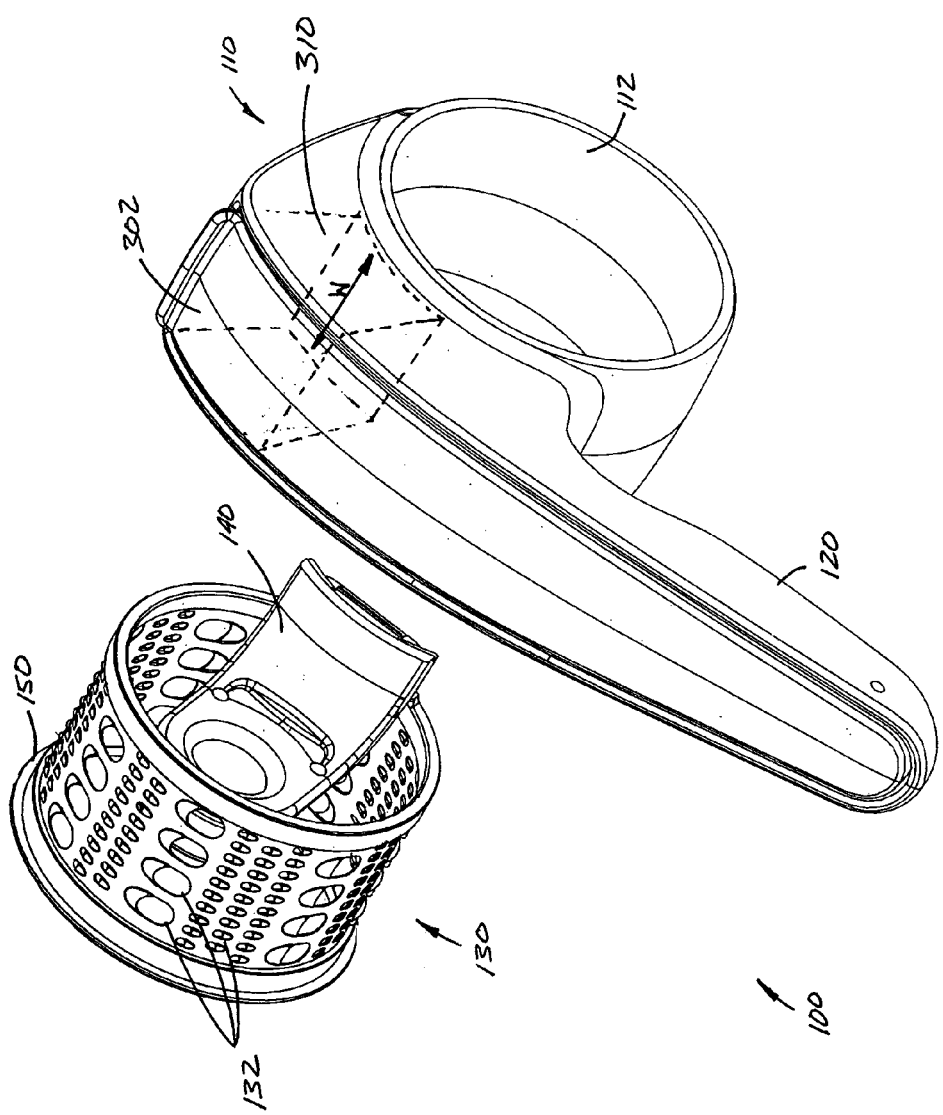
FIGS. 1–4 show a rotary grater in accordance with the present invention, depicting the progressive insertion of the barrel within the housing.

The following description is of exemplary embodiments of the invention only, and is not intended to limit the scope, applicability or configuration of the invention in any way. Rather, the following description is intended to provide a convenient illustration for implementing various embodiments of the invention. As will become apparent, various changes may be made in the function and arrangement of the elements described in these embodiments without departing from the scope of the invention.

In general, the present invention provides a novel hand-held rotary grating device configured to process soft as well as hard cheeses. As shown in FIGS. 1–4, a rotary grater 100 in accordance with one embodiment of the present invention generally includes a housing 110 having a handle end 120 configured to be grasped by an individual, a grating cylinder (or "barrel") 130 removeably and rotatably attachable to housing 110, and a handle 140 attached to and extending from grating cylinder 130. A door, hatch, or other such structure 302 is pivotally attached to housing 110 to allow cheese or other food products to be inserted in a cavity or "hopper" 310 (having a width w) that communicates with barrel 130 when it is inserted within cavity 112.

Barrel 130 includes a plurality of cutting perforations or other such structures 132 which cut, slice, gouge, or otherwise grate the material inserted into hopper 310. Barrel 130 also includes, along one edge, a bearing surface 150 which contacts housing 110 to prevent (in one direction) axial movement of barrel 130 within cavity 112.

Figure 2:
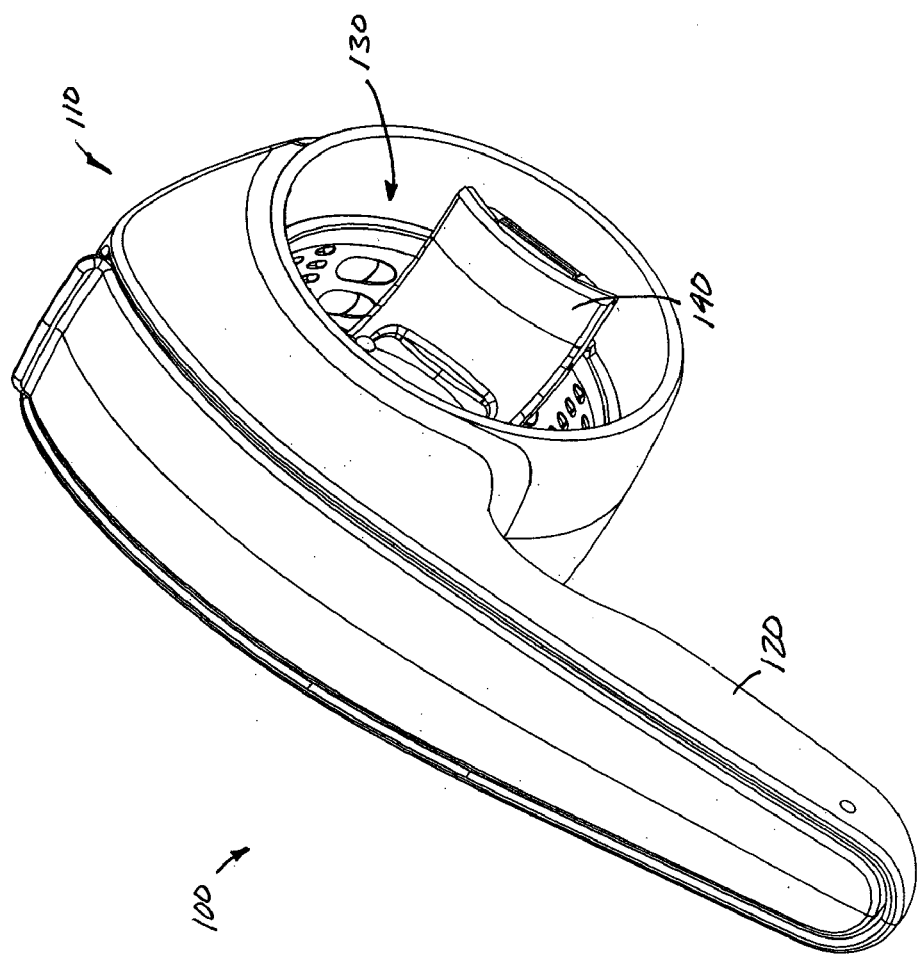
Figure 3:
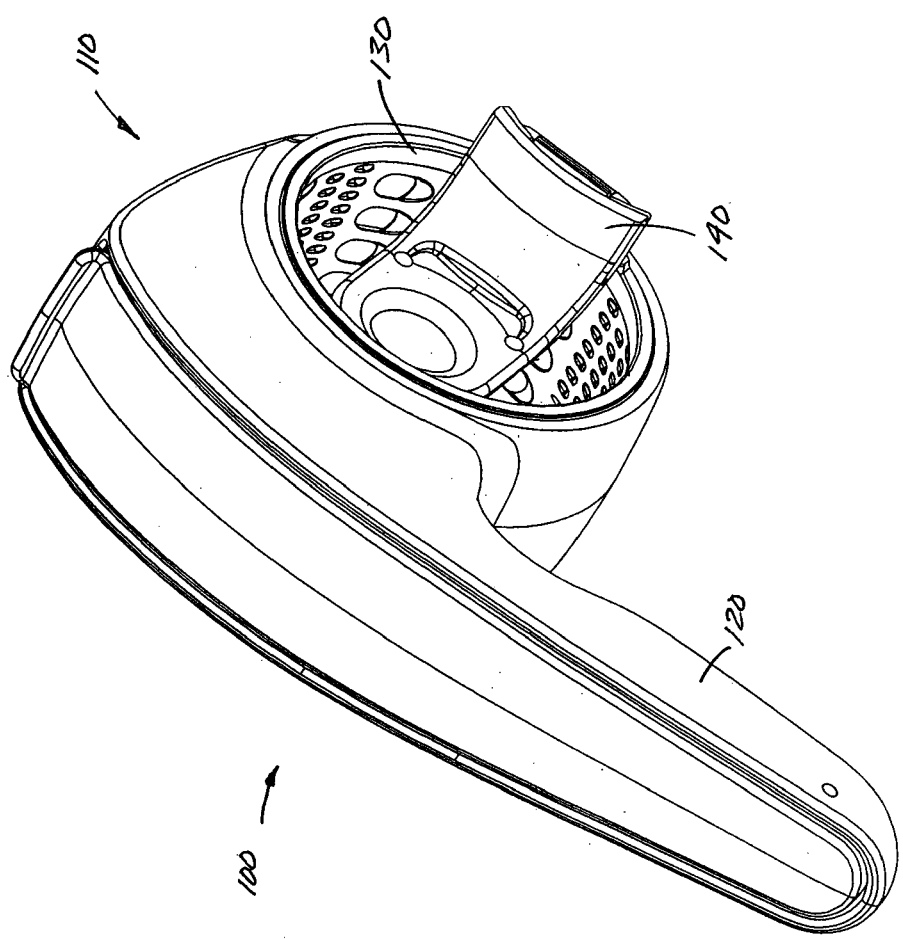

As shown in FIGS. 1 through 4, which progressively depict the insertion of barrel 130 within cavity 112 and subsequent opening of handle 140, handle 140 begins in the "closed" position (FIG. 1), allowing it to be placed within cavity 112 (FIGS. 2 and 3). The barrel is inserted transversely, and doesn't requiring threading or the like.

Figure 4:
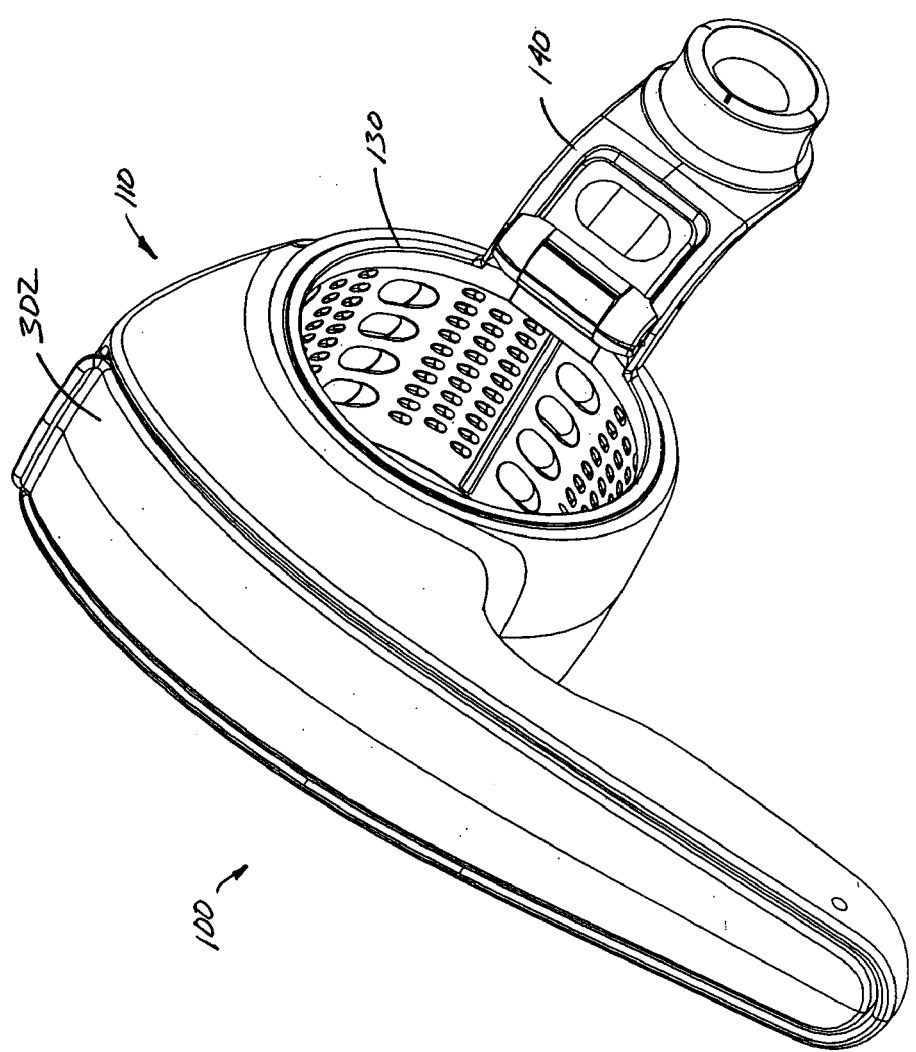

As shown in FIG. 4, handle 140 is then suitably opened, whereupon it may be manually grasped and rotated by the user. As will be described further below, handle 140 preferably includes a bearing surface which contacts housing 110 to prevent axial movement of barrel 130 with respect to housing 110.

Referring to FIG. 4, grater 100 generally works as follows: when a cheese or other material is inserted into the hopper (not shown), and hatch 302 is closed down upon the material, handle 140 may then be rotated such that the portion of the cheese within the hopper contacts cylinder 130 and is thus grated. The resulting string-like segments of cheese fall freely through grating cylinder 130 (when held such that the axis of barrel 130 is more or less perpendicular to the gravitational forces). In accordance with one aspect of the present invention, grating barrel 130 is particularly suitable for use with soft cheeses that have hitherto been impossible to grate using hand-held rotary graters.

Figure 5:
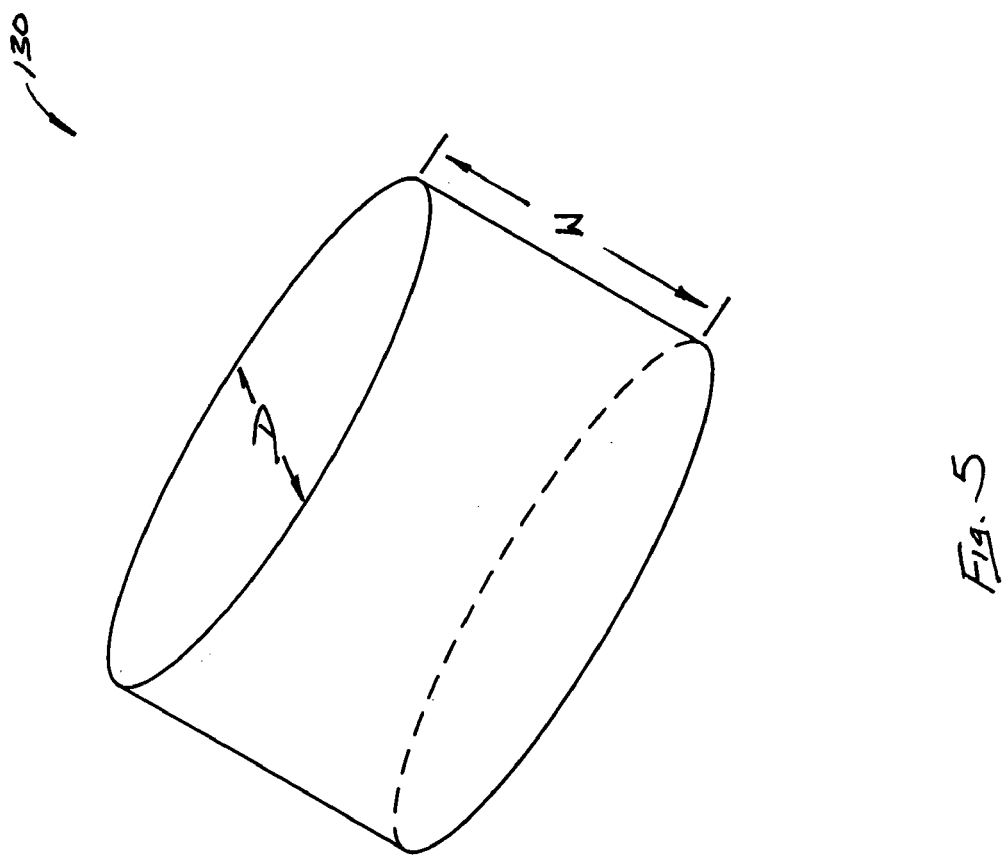
FIG. 5 is a schematic illustration of an exemplary grating cylinder, showing relevant dimensions.

More particularly, referring now to FIG. 5, grating barrel 130 has a diameter D and is exposed to the cheese along a hopper width W. The effective aspect ratio R of the cylinder (D/W) is sufficiently large that soft cheese may be effectively grated without the cheese segments blocking the inner chamber of the barrel. It should be noted that the width W corresponds to width of exposed area of the barrel within the hopper, recognizing that the hopper width might be less than the entire width of the barrel itself.

In accordance with one embodiment of the present invention, the effective aspect ratio R of barrel 130 is greater than approximately 1.5, preferably between approximately 1.5 and 2.5, most preferably about 2.0.

In accordance with another embodiment of the present invention, the barrel diameter is approximately 7.0 cm, and the hopper width is approximately 3.5 cm. It will be appreciated, however, that the present invention is not so limited. Various shapes and sizes of rotary graters having a sufficiently high cylinder aspect ratio are comprehended by the present invention.

Figure 6:
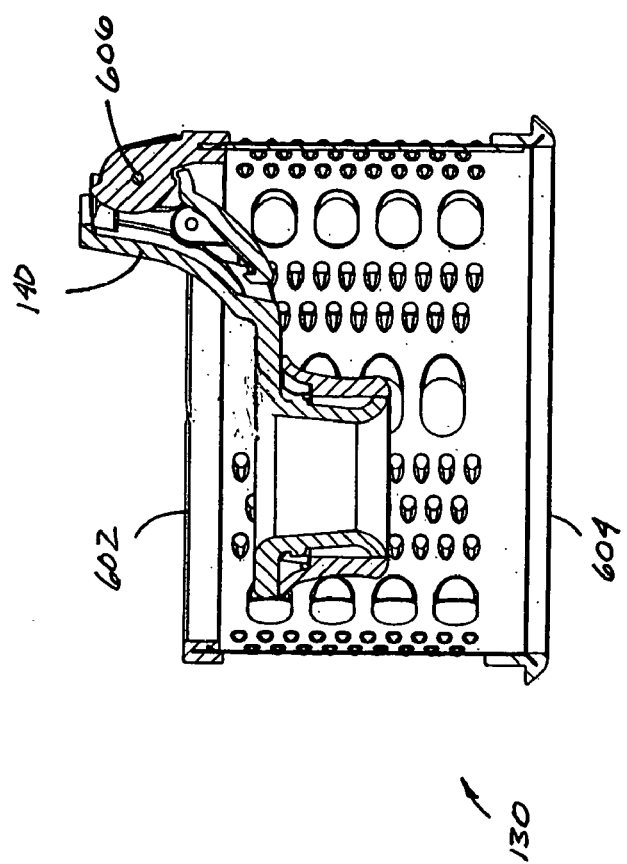
Figure 7:
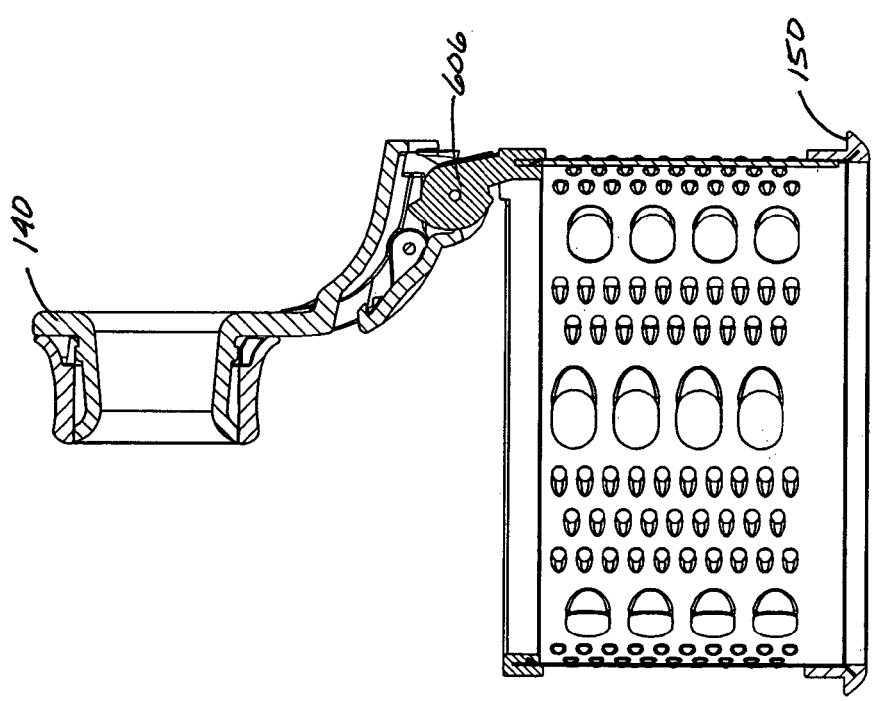

As described above, and as depicted in FIGS. 6–8, barrel 130 is preferably configured such that handle 140. in its closed state, substantially fits within barrel 130 such that the portion of handle 140 that is grasped by the user is collapsed within the boundary of sides 602 and 604 of the cylinder defined by barrel 130. As shown in FIGS. 7 and 8, handle 140 is progressively rotated around a hinge point 606 such that it is ultimately positioned in an open position (FIG. 8). It will be appreciated that this configuration allows the user to remove the barrel from the device without actually touching the sharp edges of the grating surface, and does not require the user to hold the barrel stationary during disassembly.

As shown in FIGS. 7 and 8, barrel 130 includes a bearing surface 150 around the perimeter of one end of the barrel, and a second bearing surface 850 that is produced when handle 140 is in the fully open position (FIG. 8). Bearing surface 850 is effectively removed when handle 140 is collapsed, allowing barrel 130 to be removed axially from the housing.

A suitable locking system (i.e., the rotating latch mechanism 802) may also be employed to ensure that handle 140 remains in the open position during grating. It will be appreciated that any number of other such latching mechanisms might be employed, and that the illustrated embodiment is not intended to limit the invention.

FIGS. 9 and 10 show side-view and cross-sectional illustrations, respectively, of the assembled grating apparatus in the open position. As shown, barrel 130 is restrained axially via bearing surfaces 150 and 850, both of which make contact with housing 110. Also shown is the way hopper 310 interfaces with barrel 130 and hatch 302.

Grating cylinder 130 includes a plurality of perforations, inclusions, blades, or other such cutting or scraping details 132 (referred to generally as "perforations"). The density of these cutting perforations may vary, but in one embodiment (fine grate), the cylinder 130 has about 6–12% open area (area of perforations/total area of cutting surface on cylinder). In another embodiment (coarse grate) the cylinder 130 has about 20–24% open area. The size of the perforations may vary, but in a preferred embodiment the "coarse" perforations are generally oval and have end diameters of between about 5.0 mm and 6.0 mm, and the "fine" perforations have a diameter between about 1.0 and 2.0 mm.

FIGS. 11A through 11D show a number of example grating patterns appropriate for use in connection with the present invention, and FIG. 12 shows the orientation of the grating patterns with respect to the barrel. For the purpose of clarity, the barrel has been "unwrapped" to display the grating patterns.

In FIG. 11A, barrel 130 includes a grating pattern characterized by a three-column set 502 of fine perforations (a first region), a single column 504 of coarse perforations (a second region), and a two-column set 506 of fine perforations (a third region). The columns of fine perforations (502, 506) are staggered to increase material removal. This pattern is repeated across the entire barrel such that there are a total of seven columns 506 of coarse perforations.

FIG. 11B shows an alternate grating pattern characterized by a large contiguous region 502 of fine perforations and a second contiguous region 504 of coarse perforations.

FIG. 11C shows a grating pattern similar to that shown in FIG. 11B, except that the regions 502 and 504 have a border that is not perpendicular to the sides of barrel 130, but at an angle (e.g., a 45 degree angle) with respect to the sides of the barrel.

FIG. 11D shows yet another grating pattern characterized by a region 502 of fine perforations (disposed at a slight angle with respect to the sides of barrel 130), an elongated cutting region 508, and a blank (un-perforated) region 510.

In accordance with another aspect of the present invention, barrel is bi-directional in that two or more grating patterns are disposed on barrel 130 such that the cutting edges are oriented in opposite directions. Thus, when barrel 130 is rotated in one direction, the grater produces coarsely-grated cheese, and when rotated in the other direction, produces a finely-grated cheese.

It will be appreciated that the grating patterns shown in FIGS. 11A–11D are merely examples, and that the dimensions of these patterns will depend upon a number of factors, including the width and diameter of barrel 130, the size of the perforations, the number of regions, and the size and shape of these regions. The illustrated dimensions are therefore only examples, and are not intended to limit the scope of the present invention.

In general, the present invention has been described above with respect to a particular exemplary embodiment. However, many changes, combinations and modifications may be made to the exemplary embodiments without departing from the scope of the present invention.

The invention claimed is:

1. A hand-held rotary grater apparatus comprising:
   a grater housing having a cylindrical cavity and a hopper communicating with said cylindrical cavity, said hopper having a hopper width;
   a cylindrical grating barrel having a handle attached thereto and configured to rotateably fit within said cavity, said barrel having a grating pattern characterized by a plurality of cutting perforations, said handle being collapsibly attached to said barrel such that said handle has a closed position and an open position, wherein said handle substantially fits within said barrel in said closed position to facilitate removal of said barrel from said housing;

said barrel having a barrel diameter and a barrel aspect ratio defined by the ratio of said barrel diameter to said hopper width.

2. The apparatus of claim 1, wherein said barrel aspect ratio is between approximately 1.5 and 2.5.

3. The apparatus of claim 2, wherein said barrel aspect ratio is approximately 2.0.

4. The apparatus of claim 1, wherein said barrel aspect ration is greater than 2.0.

5. The apparatus of claim 1, wherein said handle includes a bearing surface that contacts said housing to substantially prevent axial movement of said barrel with respect to said housing when said handle is in said open position.

6. The apparatus of claim 1, wherein said grating pattern includes at least two regions, wherein a first region includes a plurality of large perforations, and said second region includes a plurality perforations that are smaller than those in said first region.

7. The apparatus of claim 1, wherein said grating pattern has between approximately 6.0% to 12.0% open area.

8. The apparatus of claim 1, wherein said grating pattern has been approximately 20% to 24% open area.

9. The apparatus of claim 6, wherein said barrel is bidirectional and wherein the orientation of the cutting edges of said first region are oriented substantially opposite of the direction of the cutting edges of said second region.

10. A hand-held rotary cheese grater configured to grate soft cheeses, said grater comprising:

a grater housing having a cylindrical cavity and a hopper communicating with said cylindrical cavity, said hopper having a hopper width;

a cylindrical grating barrel having a collapsible handle attached thereto and configured to rotateably fit within said cavity, said grating barrel having a grating pattern characterized by a plurality of cutting perforations, said handle being collapsibly attached to said barrel such that said handle has a closed position and an open position, wherein said handle substantially fits within said barrel in said closed position to facilitate removal of said barrel from said housing;

said grating barrel having a diameter, and a barrel aspect ratio defined by the ratio of said diameter to said hopper width, wherein said barrel aspect ratio is approximately 2.0.

11. A hand-held rotary cheese grater configured to grate soft cheeses, said grater comprising:

a grater housing having a cylindrical cavity and a hopper communicating with said cylindrical cavity, said hopper having a hopper width;

a cylindrical grating barrel having a collapsible handle attached thereto and configured to rotateably fit within said cavity, said grating barrel having a grating pattern characterized by a plurality of cutting perforations said handle is collapsibly attached to said barrel such that said handle has a closed position and an open position, wherein said handle substantially fits within said barrel in said closed position to facilitate removal of said barrel from said housing.

12. The apparatus of claim 11, wherein said handle includes a bearing surface that contacts said housing to substantially prevent axial movement of said barrel with respect to said housing when said handle is in said open position.

\* \* \* \* \*